United States Patent [19]

Birke et al.

[11] 4,194,882
[45] Mar. 25, 1980

[54] PROCESS FOR THE DYEING OR PRINTING OF POLYESTER FIBERS

[75] Inventors: Walter Birke; Hans-Ulrich von der Eltz; Franz Schön, all of Frankfurt am Main, Fed. Rep. of Germany

[73] Assignee: Hoechst Aktiengesellschaft, Frankfurt am Main, Fed. Rep. of Germany

[21] Appl. No.: 903,051

[22] Filed: May 4, 1978

[30] Foreign Application Priority Data

May 7, 1977 [DE] Fed. Rep. of Germany ....... 2720587

[51] Int. Cl.² .................. C09B 27/00; D06P 1/02
[52] U.S. Cl. .................................. 8/41 B; 8/41 C; 8/94 A
[58] Field of Search ................. 8/41 B, 41 C, 94 A

[56] References Cited

U.S. PATENT DOCUMENTS

| | | | |
|---|---|---|---|
| 3,125,402 | 3/1964 | Kruckenberg et al. | 8/41 R |
| 3,988,109 | 10/1976 | Schuierer | 8/94 R |
| 4,121,899 | 10/1978 | Chambers et al. | 8/94 A |

FOREIGN PATENT DOCUMENTS 2262713 10/1975 France.
792210 3/1958 United Kingdom.

OTHER PUBLICATIONS

Venkataramen, K., "The Chemistry of Synthetic Dyes," vol. III (Academic Press), 1970, pp. 432–433.

Primary Examiner—A. Lionel Clingman
Attorney, Agent, or Firm—Curtis, Morris & Safford

[57] ABSTRACT

In the process for the pad-dyeing or printing of materials consisting of, or containing, polyester or polyamide fibers or filaments, whereat in known manner the said materials are padded or printed with an aqueous liquor or printing paste of disperse dyestuffs, and subsequently the dyestuffs are fixed by means of liquid or gaseous methylene chloride or of both of the said phases of methylene chloride, the improvement that a dyestuff of the formula

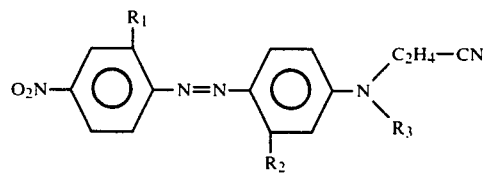

in which $R_1$ represents hydrogen, chlorine, bromine or cyano, $R_2$ represents hydrogen, chlorine or alkyl of 1 to 3 carbon atoms and $R_3$ stands for alkyl of 1 to 5 carbon atoms,

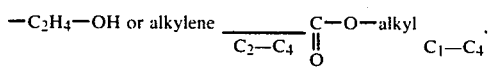

is applied.

1 Claim, No Drawings

PROCESS FOR THE DYEING OR PRINTING OF POLYESTER FIBERS

The present invention relates to a process for the dyeing or printing of polyester fibers.

From German Auslegeschrift No. 2 433 662 a process for the dyeing and finishing of textile goods has already been known, according to which a solution or dispersion of a dyestuff or chemical agent appropriate for application is applied onto the textile goods which are subsequently subjected to the action of air enriched with a halogenated hydrocarbon having a temperature of about 30° C. at a maximum, for the purpose of dyestuff fixation. This process comprises applying the dyestuff and/or chemical agent in an aqueous solution or dispersion onto the textile goods and then exposing the latter to an air current which has been enriched with methylene chloride.

From German Patent Specification No. 1 040 501 a process for the dyeing of textile goods of synthetic fibers has been known, according to which the textile goods are passed first through an aqueous solution of the dyestuff and are then heated in order to eliminate water. Subsequently, the textile goods are exposed to the saturated vapor of methylene chloride for the fixation of the dyestuff, in which process the methylene chloride is condensed.

Furthermore, a process for the pad-dyeing or printing of materials consisting of, or containing, polyester or polyamide fibers or filaments has been proposed, in which process aqueous baths and/or printing pastes of disperse dyestuffs are applied in common manner onto the materials, and the dyestuffs are then fixed by a treatment with methylene chloride. This process comprises bringing the padded or printed and optionally dried material into a close contact with an accompanying material containing methylene chloride, or bonding said material on one side with an accompanying material which is then moistened with methylene chloride, and thereafter allowing the material to dwell in either case at a temperature of up to 41° C.

According to another process proposed, in which aqueous baths and/or printing pastes of disperse dyestuffs are also applied in common manner onto materials of polyester or polyamide fibers or filaments, the fixation of the dyestuffs is effected by applying methylene chloride in a liquid form onto the padded or printed and optionally dried material by way of spraying, sprinkling, foaming, padding, or by means of rollers or brushes.

Another process has also been known, from which an aftertreatment with methylene chloride can be gathered, wherein the methylene chloride is present as saturated vapor, and a condensation of this agent on the fiber is effected. It has also been proposed before to apply the methylene chloride for the after-treatment by way of spraying, sprinkling, foaming, padding, or by means of rollers and brushes.

All these known or proposed processes show as common process step the dyestuff fixation in the presence of methylene chloride (or probably by the methylene chloride), wherein the methylene chloride is present in a liquid and/or gaseous phase.

It has now been found that materials which consist of, or contain, polyester or polyamide fibers or filaments can be pad-dyed or printed, in which process the materials are padded and/or printed in common manner with aqueous baths and/or printing pastes of disperse dyestuffs, and subsequently the dyestuffs are fixed by the action of liquid and/or gaseous methylene chloride, by using dyestuffs of the general formula

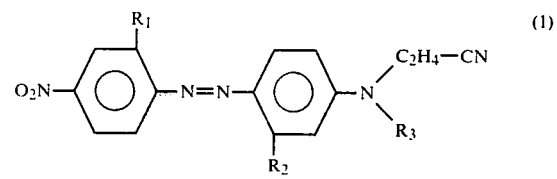

in which $R_1$ stands for a hydrogen, chlorine or bromine atom or the CN group, $R_2$ represents a hydrogen or chlorine atom or an alkyl group having from 1 to 3 carbon atoms, and $R_3$ is an alkyl group having from 1 to 5 carbon atoms, preferably from 2 to 4 carbon atoms, the group —$C_2H_4$—OH or the group

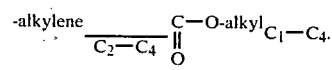

For the dyeing processes comprising the dyestuff fixation in the presence of methylene chloride, the experiences made through processes for the dyeing of polyester fiber materials of the common kind are not applicable in any manner. Thus, for example, especially the dyestuffs of the formulae

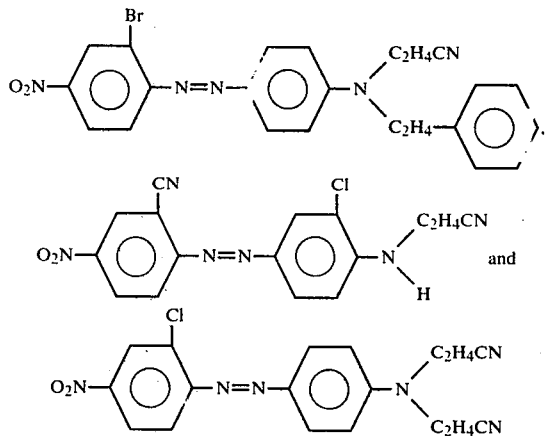

only lead to insufficient dyestuff yields, although very good dyestuff yields are obtained with these dyestuffs according to the conventional methods (i.e. without fixation in the presence of methylene chloride).

Of the dyestuffs of the above mentioned formula (1) which are used according to the novel process, the following dyestuffs are particularly appropriate:

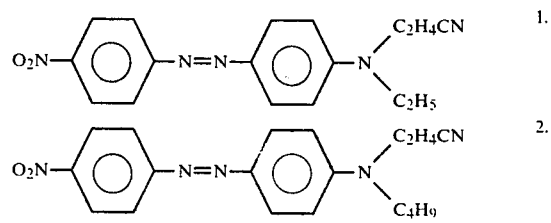

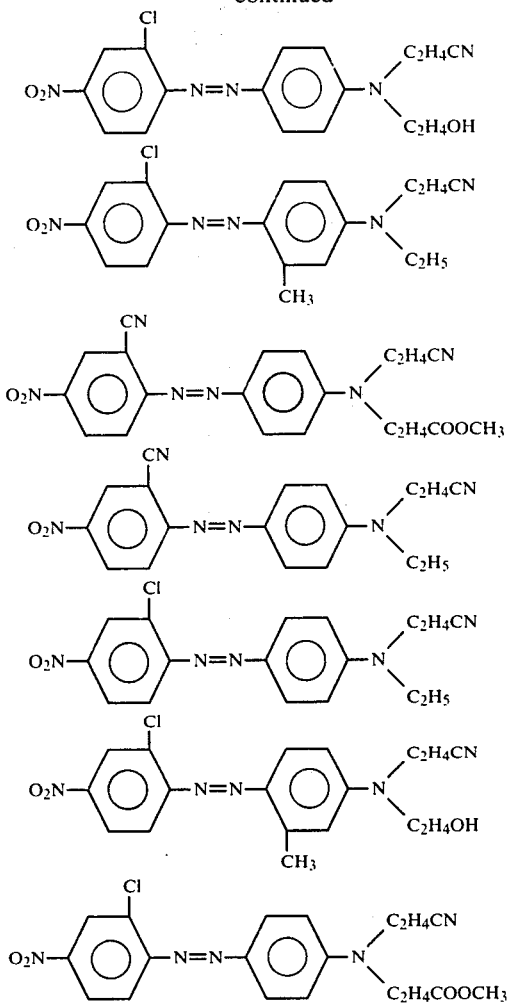

The following Examples serve to illustrate the invention.

EXAMPLE 1

A fabric of texturized polyester fibers is padded on a padder at room temperature with a liquor pick-up of 90% with an aqueous bath containing per liter 20 g of the dyestuff of the formula

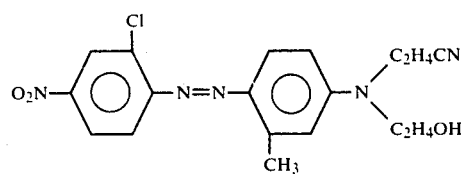

and 1 g of a commercial wetting agent.

Subsequently, the padded wet fabric is passed for 1 minute through a chamber filled with methylene chloride vapor. After the condensation has been completed, the material is wound up. Thereafter, the material is allowed to dwell in a closed container or in a sheet which is not permeable for methylene chloride for 3 hours at room temperature and is then subjected to an after-treatment in common manner.

The red dyeing obtained shows the fastness properties that are characteristic of the dyestuff used.

EXAMPLE 2

A fabric of texturized polyester fibers is padded on a padder at room temperature with a liquor pick-up of 90% with an aqueous bath which contains per liter 20 g of the dyestuff of the formula

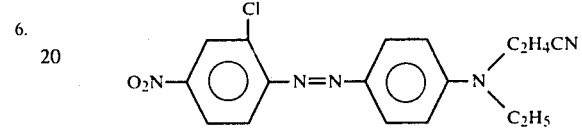

and 1 g of a commercial wetting agent.

At the same time a cotton fabric is padded with methylene chloride. Both fabrics are wound up together. Subsequently, they are allowed to dwell for 3 hours at room temperature. Following an after-treatment common for polyester fibers a scarlet dyeing is obtained which shows the fastness properties that are characteristic of the dyestuff used.

EXAMPLE 3

A mixed fabric of polyester fibers and cotton (67:33) is impregnated on a padder with a liquor pick-up of about 65% with an aqueous bath which contains per liter 20 g of the dyestuff of the formula

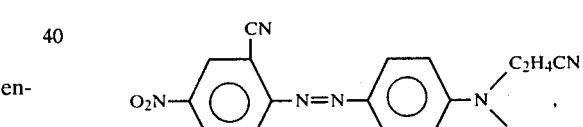

20 g of the dyestuff of the formula

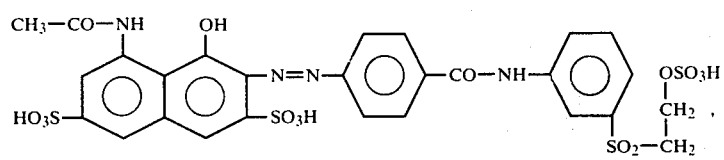

2 g of a commercial wetting agent and 20 ml of 32.5% sodium hydroxide solution.

The padded wet fabric is then wound up together with a viscose fabric which is moist with methylene chloride. Subsequently, the material is allowed to dwell for 3 hours at room temperature. Upon completing the dyeing by rinsing with hot water and soaping at the boil with 1 g/l of a non-ionogenic detergent as well as by rinsing and drying, a red dyeing is obtained on both fiber portions.

EXAMPLE 4

A textile material of texturized polyester filaments is impregnated with an aqueous dyestuff liquor which contains 10 g/l of the dyestuff of the formula

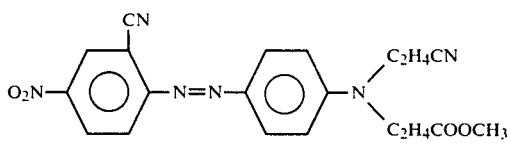

The impregnated material is wound up on a perforated cylinder. Thereafter, air enriched with methylene chloride is passed through the material roll. Following a treatment period of 4 hours at room temperature the material is treated with water vapor. The dyeing is completed as usual by rinsing and drying.

A red dyeing is obtained which shows good fastness properties.

EXAMPLE 5

A knitted fabric of texturized polyester filaments is padded on a padder at room temperature with a liquor pick-up of 90% with an aqueous liquor which contains per liter 20 g of the dyestuff of the formula

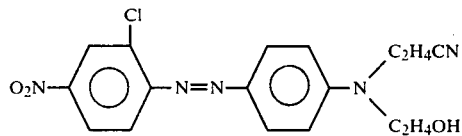

and 1 g of a commercial wetting agent.

Simultaneously, a polyester fabric is padded with methylene chloride. Subsequently, the knitted fabric and the polyester fabric are wound up together, however, while being separated from each other by polyethylene sheets. Subsequently, the goods are allowed to dwell for 3 hours at room temperature. Following a reductive alkaline after-treatment which is common for polyester fibers a scarlet dyeing is obtained which shows the fastness properties that are characteristic of the dyestuff used.

EXAMPLE 6

A fabric of polyester staple fibers is printed with a printing paste which contains per kilogram 20 g of the orange dyestuff of the formula

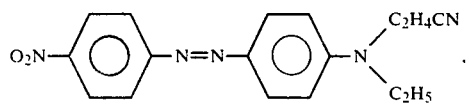

906 g of water, 50 g of a sodium alginate, 16 g of a starch ether, 6.7 g of a water softening agent on the basis of polyphosphate, and 1.3 g of citric acid. In order to fix the dyestuff, the printed goods are processed according to the method described in Example 3.

A print is obtained which shows the fastness properties that are characteristic of the dyestuff used.

EXAMPLE 7

The process is carried out according to the method described in Example 1, however, with the difference that a car safety belt of polyester filaments of high tenacity is padded and allowed to dwell, following the winding-up, for 3 hours in the dwelling chamber at a temperature of from 40° to 41° C., while being turned. An even red dyeing is obtained with an excellent penetration of the dyestuff.

Besides, a shrinkage of about 20% is obtained, which corresponds to the common values reached in thermal processes (as in a one-minute treatment with hot air at a temperature in the range of from 200° to 210° C.).

EXAMPLE 8

A cross-wound bobbin (600 g) of polyester staple fiber yarn is impregnated on a laboratory dyeing apparatus with a bath which contains per liter of water 20 g of the dyestuff

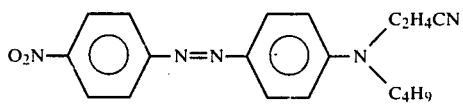

and 2 g/l of a commercial wetting agent.

Subsequently, the cross-wound bobbin is centrifuged, until it contains a residual amount of water of 20%. The material thus impregnated is placed onto a perforated material carrier. The dyestuff fixation is effected by passing air enriched with methylene chloride for 3 hours at room temperature through the yarn roll. The orange dyeing obtained is completed by a common alkaline reductive after-treatment.

A bobbin is obtained which shows an unobjectionable penetration of the dyestuff. The dyeing shows the fastness properties which are characteristic of the dyestuff used.

We claim:

1. In the process for the pad-dyeing or printing of materials consisting of, or containing, polyester or polyamide fibers or filaments, whereat in known manner the said materials are padded or printed with an aqueous liquor or printing paste of disperse dyestuffs, and subsequently the dyestuffs are fixed by means of liquid or gaseous methylene chloride or of both of the said phases of methylenechloride, the improvement that a dyestuff of the formula

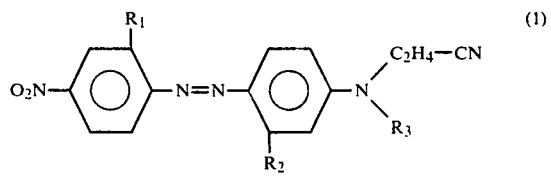

(1)

in which $R_1$ represents hydrogen, chlorine, bromine or cyano, $R_2$ represents hydrogen, chlorine or alkyl of 1 to 3 carbon atoms and $R_3$ stands for alkyl of 1 to 5 carbon atoms,

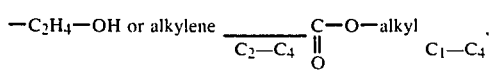

is applied

* * * * *